United States Patent
Asem

(10) Patent No.: US 12,114,620 B1
(45) Date of Patent: Oct. 15, 2024

(54) VERTICAL TUBERS PLANTER AND HARVESTER

(71) Applicant: KUWAIT INSTITUTE FOR SCIENTIFIC RESEARCH, Safat (KW)

(72) Inventor: Samira Omar Asem, Safat (KW)

(73) Assignee: KUWAIT INSTITUTE FOR SCIENTIFIC RESEARCH, Safat (KW)

( * ) Notice: Subject to any disclaimer, the term of this patent is extended or adjusted under 35 U.S.C. 154(b) by 0 days.

(21) Appl. No.: 18/241,049

(22) Filed: Aug. 31, 2023

(51) Int. Cl.
  *A01G 9/02*  (2018.01)
  *A01G 9/24*  (2006.01)
  *A01G 22/25* (2018.01)

(52) U.S. Cl.
  CPC .............. *A01G 9/023* (2013.01); *A01G 9/247* (2013.01); *A01G 9/249* (2019.05); *A01G 22/25* (2018.02)

(58) Field of Classification Search
  CPC .......... A01G 9/023; A01G 9/022; A01G 9/00; A01G 9/02; A01G 31/00; A01G 31/06
  See application file for complete search history.

(56) References Cited

U.S. PATENT DOCUMENTS

| | | | |
|---|---|---|---|
| 5,438,797 A | 8/1995 | Lendel | |
| 9,456,689 B1 | 10/2016 | Tinsley | |
| 2011/0252705 A1* | 10/2011 | Van Gemert | A01G 9/249 47/66.7 |
| 2013/0212940 A1 | 8/2013 | Blyden | |
| 2015/0107154 A1* | 4/2015 | Visser | A01G 9/249 47/66.6 |
| 2017/0105360 A1 | 4/2017 | Kingelin et al. | |
| 2017/0150686 A1 | 6/2017 | Erbacher | |
| 2018/0054986 A1* | 3/2018 | Fu | A01G 31/04 |
| 2018/0103599 A1* | 4/2018 | Zhan | A01G 31/02 |
| 2018/0317411 A1* | 11/2018 | Spiro | A01G 31/06 |
| 2018/0332774 A1 | 11/2018 | Lott | |
| 2019/0335691 A1* | 11/2019 | Krakover | A01G 31/06 |
| 2020/0315100 A1* | 10/2020 | Kiessling | A01G 9/023 |
| 2020/0375120 A1* | 12/2020 | Kaneko | A01G 27/003 |
| 2021/0100173 A1 | 4/2021 | Khwaja et al. | |
| 2021/0259169 A1 | 8/2021 | Valiquette | |
| 2022/0174886 A1 | 6/2022 | Kalinowski | |
| 2022/0217914 A1* | 7/2022 | Olsson | A01G 9/023 |
| 2023/0026903 A1* | 1/2023 | Kendall | A01G 9/247 |
| 2023/0148499 A1* | 5/2023 | Fujisawa | A01G 9/247 47/62 R |

FOREIGN PATENT DOCUMENTS

| | | |
|---|---|---|
| CN | 203537830 U | 4/2014 |
| CN | 108697057 A | 10/2018 |
| GB | 2477216 A | 7/2011 |
| RU | 2693721 C1 | 7/2019 |

* cited by examiner

*Primary Examiner* — Kristen C Hayes
(74) *Attorney, Agent, or Firm* — Nath, Goldberg & Meyer; Richard C. Litman

(57) ABSTRACT

A system and method for using indoor vertical farming for cultivating tubers. The method and system include a wheeled framework with tiered platforms, the platforms forming multiple growing spaces for growing portions of a tuber crop and soil where the growing spaces are provided with irrigation and illumination. Each growing space has a paneled wheeled planter tray which rests on a platform and each portion of the tuber crop and soil can be extracted from each paneled wheeled planter tray by a lifting action to fall into a mesh covered container, used to separate the soil from the tuber crop.

6 Claims, 3 Drawing Sheets

SIMPLIFIED DESIGN FOR THE VERTICAL TUBER PLANTER & HARVESTER

VERTICAL TUBERS PLANTER AND HARVESTER

BACKGROUND

1. Field

The present disclosure relates to a tiered planter for the cultivation, growth, and harvesting of potatoes and other root tubers.

2. Description of the Related Art

Current harvesting techniques for harvesting root tubers include both mechanical harvesting and manual harvesting modalities including but not limited to the use of hand-hoes, animal drawn lifters, and tractors or other mechanically drawn lifters. However, these methods are inadequate as the tuber crop is either damaged or lost during the harvesting process. For instance, hand digging can lead to a tuber damage rate of 40% of the total crop yield and furthermore, up to 20% of the crop yield can be left underground unharvested.

Tuber digging is a cumbersome and labor-intensive process and requires multiple man-hours per hectare when done manually. The tuber digging process generally begins with a tuber being lifted by a worker using a spade, digging hoe, digging forks, or other well-known farm implements for manual tillage. However, the lifting of tubers can also be facilitated by animal drawn ploughs. The problem with current methods is the significant amount of crop loss due to physical damage and/or inefficient tuber retrieval methods which fail to extract all the tuber crops.

What is needed is a system and method for tuber cultivation, growth, and harvesting that allows for the efficient extraction and retrieval of planted tubers such that loss and physical damage are greatly minimized.

SUMMARY

The present subject matter is directed towards a portable and vertically deployed system and method that will improve the growing and harvesting of tubers. It can be placed indoors, in homes, gardens, and/or farms, depending upon the desired scale of production. The indoor application of the Vertical Tubers Planter & Harvester (VTPH) is particularly prescient given the fact that the Earth's increasing population will outstrip resources essential to food production within the next 25 years, and, furthermore, that upwards of 80 percent of this additional population will primarily reside within urban centers. Usable farmland and freshwater supplies are being depleted at an ever-increasing rate. This makes a migration towards indoor farming, especially within city limits, an attractive alternative to the reliance upon farmland resources.

It is noted that indoor farming is not new, however, its growth has been stymied and it has failed to gain the traction necessary for mainstream appeal and acceptance. Most manifestations of indoor vertical farming have been relatively small, spotty individual efforts, such as, for example, greenhouses on rooftops or perhaps spread across a few acres of ground, or crude setups in relatively small warehouses. These limited efforts are at least partly due to underdeveloped strategies resulting from narrowly focused thinking.

At the same time, it is well known that many cities have excessive inventories of inactive commercial and residential buildings (e.g., office buildings, warehouse complexes, apartment complexes, strip malls, old hotels, and the like) and it would be highly desirable to see them revitalized into useful establishments. The development of the current technology would enable these buildings to support the growth of a wide variety of farm produce.

In fact, it is likely that at least some individuals have successfully attempted to create indoor plant growth systems that function indoors where they are not vulnerable to insects, pests, vermin, adverse weather conditions, and utilize artificial lighting so that they are not reliant on natural lighting. However, there has been a lack of adequate equipment having the necessary characteristics, such as high-load bearing capability (enabling growth of heavier vegetables such as potatoes and other root tubers), highly efficient use of space, and a flexible design that allows for scalability which would lend itself to the implementation of plant growing modules that could be easily transported from location to location along a support surface (e.g., a floor), combinable to form optimized tuber growing systems, easily configurable, and combinable for maximizing efficient implementation across a myriad of varying application specific pre-existing indoor space configurations.

In one aspect of the present subject matter, the Vertical Tubers Planter and Harvester (VTPH) has a support assembly which includes: a bottom platform having a rolling mechanism to facilitate a rolling movement of the VTPH along an underlying support surface; a plurality of vertically oriented elongated posts arranged parallel and spaced apart from one another, and extending upwards from corners of an upper surface of the bottom platform; an intermediate platform positioned above said bottom platform and spaced apart therefrom, said intermediate platform attached to said plurality of vertically oriented elongated posts arranged parallel and spaced apart from one another at corners of said intermediate platform; a top platform positioned above said intermediate platform and spaced apart therefrom, wherein said plurality of vertically oriented elongated posts are arranged parallel and spaced apart from one another, and extend upwards from corners of an upper surface of said intermediate platform attach to a lower surface of said top platform at corners of said lower surface of top platform; a first wheeled planter tray resting on said upper surface of said bottom platform; a second wheeled planter tray resting on an upper surface of said intermediate platform; a plurality of water sprinkler heads mounted on said lower surface of said top platform and a lower surface of said intermediate platform; a plurality of lights mounted on said lower surface of said top platform and said lower surface of said intermediate platform; and a plurality of wheels mounted at a respective bottom end of said plurality of vertically-oriented elongated posts.

In an embodiment, the present subject matter relates to a system for planting and harvesting tubers, the system comprising:

a vertical tuber planter and harvester comprising a tiered and wheeled framework having various platforms located thereon comprising: a bottom platform having a rolling mechanism to facilitate a rolling movement of the vertical tuber planter and harvester along an underlying support surface; a plurality of vertically oriented elongated posts arranged parallel and spaced apart from one another and extending upwards from corners of an upper surface of the bottom platform; an intermediate platform positioned above said bottom platform and spaced apart from said bottom platform, said intermediate platform attached to said plurality of vertically oriented elongated posts arranged parallel and spaced apart from one another at corners of said intermediate platform, said plurality of vertically oriented elongated posts extending upwards from an upper surface of said corners of said intermediate platform; a top platform positioned above said intermediate platform and spaced apart from said intermediate platform, wherein said plurality of vertically oriented elongated posts arranged parallel and spaced apart from one another and extending upwards from the upper surface of the corners of said intermediate platform attach to a lower surface of said top platform at corners of said lower surface of said top platform; a first paneled wheeled planter tray resting on said upper surface of said bottom platform, wherein said first paneled wheeled planter tray, when in a closed configuration, is a receptable containing a first collection of soil and a first portion of a tuber crop; a second paneled wheeled planter tray resting on said upper surface of said intermediate platform wherein said second paneled wheeled planter tray, when in a closed configuration, is a receptable containing a second collection of soil and a second portion of said tuber crop; a plurality of water sprinkler heads mounted on said lower surface of said top platform and a lower surface of said intermediate platform; and a plurality of growing lights mounted on said lower surface of said top platform and said lower surface of said intermediate platform; and a mesh covered container having a shaker used to separate one or more of the first collection of soil from the first portion of the tuber crop, or the second collection of soil from the second portion of the tuber crop.

Another aspect of the present subject matter is a method which, when implemented with the device and system described herein, performs the function of cultivating, growing, and harvesting root tubers and potatoes.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF EMBODIMENTS

Figure 1:
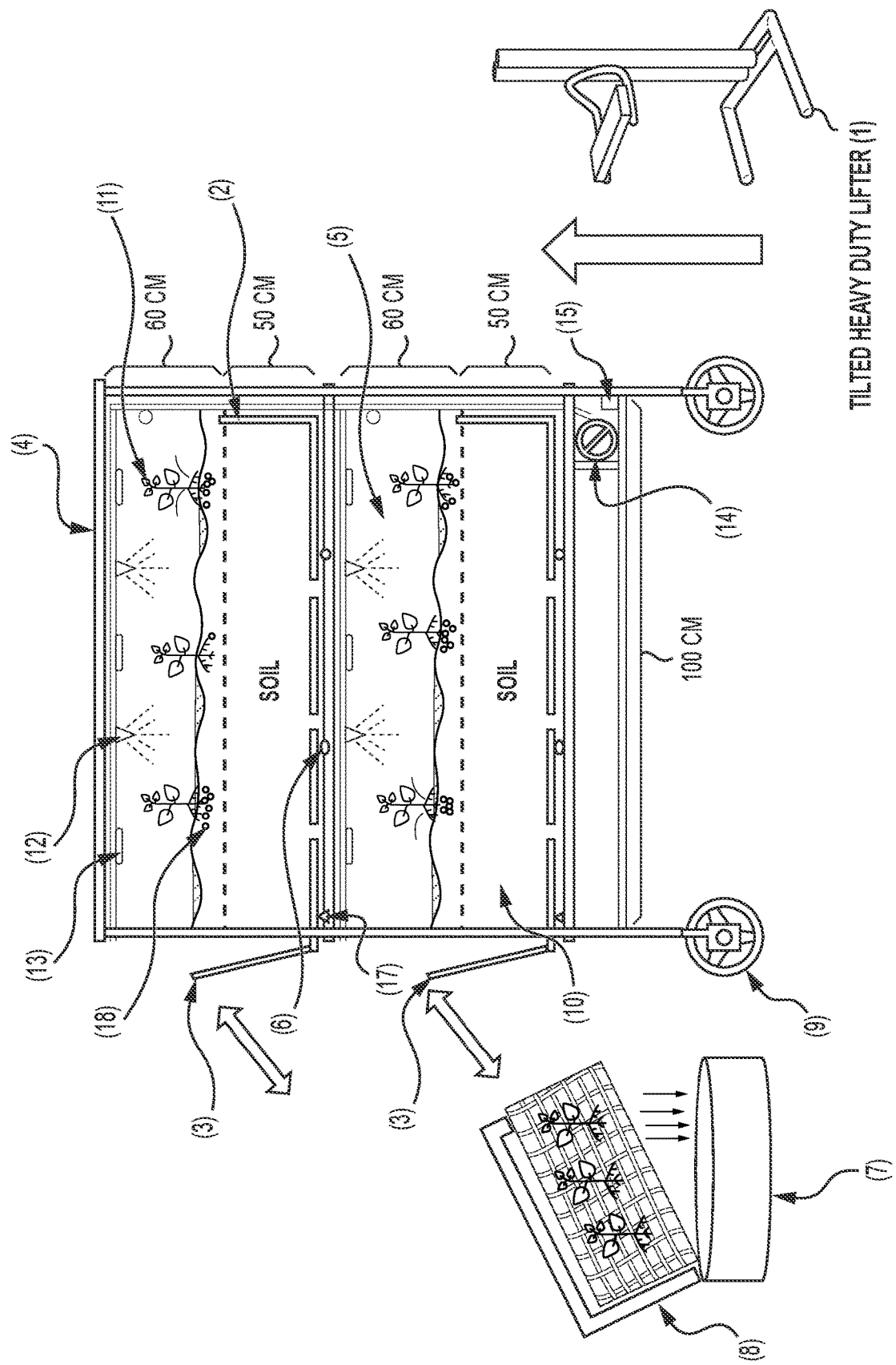
FIG. 1 is a side-view diagram of the VTPH device.

The following detailed description is merely exemplary in nature and is not intended to limit the described embodiments or the application and uses of the described embodiments. Any implementation described herein with the words "exemplary" or "illustrative" is not necessarily construed as preferred or advantageous over other implementations. All of the implementations described below are exemplary implementations provided to enable persons skilled in the art to make or use the embodiments of the disclosure and are not intended to limit the scope of the disclosure, which is defined by the claims.

For the purposes of the description herein, there is no intention to be bound by any expressed or implied theory presented in the preceding technical field, background, summary, or the following detailed description. It is also to be understood that the specific devices and processes illustrated in the attached drawings, and described in the following specification, are simply exemplary embodiments of the concepts defined in the appended claims. Hence, specific dimensions and other physical characteristics relating to the embodiments disclosed therein are not to be considered as limiting, unless the claims expressly state otherwise.

In one embodiment, the present subject matter relates to a system for planting and harvesting tubers, the system comprising:

a vertical tuber planter and harvester comprising a tiered and wheeled framework having various platforms located thereon comprising: a bottom platform having a rolling mechanism to facilitate a rolling movement of the vertical tuber planter and harvester along an underlying support surface; a plurality of vertically oriented elongated posts arranged parallel and spaced apart from one another and extending upwards from corners of an upper surface of the bottom platform; an intermediate platform positioned above said bottom platform and spaced apart from said bottom platform, said intermediate platform attached to said plurality of vertically oriented elongated posts arranged parallel and spaced apart from one another at corners of said intermediate platform, said plurality of vertically oriented elongated posts extending upwards from an upper surface of said corners of said intermediate platform; a top platform positioned above said intermediate platform and spaced apart from said intermediate platform, wherein said plurality of vertically oriented elongated posts arranged parallel and spaced apart from one another and extending upwards from the upper surface of the corners of said intermediate platform attach to a lower surface of said top platform at corners of said lower surface of said top platform; a first paneled wheeled planter tray resting on said upper surface of said bottom platform, wherein said first paneled wheeled planter tray, when in a closed configuration, is a receptable containing a first collection of soil and a first portion of a tuber crop; a second paneled wheeled planter tray resting on said upper surface of said intermediate platform wherein said second paneled wheeled planter tray, when in a closed configuration, is a receptable containing a second collection of soil and a second portion of said tuber crop; a plurality of water sprinkler heads mounted on said lower surface of said top platform and a lower surface of said intermediate platform; and a plurality of growing lights mounted on said lower surface of said top platform and said lower surface of said intermediate platform; and a mesh covered container having a shaker used to separate one or more of the first collection of soil from the first portion of the tuber crop, or the second collection of soil from the second portion of the tuber crop.

In an embodiment, the vertical tuber planter and harvester used in the present system can further comprise a water pump for pumping water to the plurality of water sprinkler heads. In another embodiment, the vertical tuber planter and harvester can further comprise an electrical socket for connecting to an electrical power source to provide electricity to the water pump and the growing lights. In a further embodiment, the vertical tuber planter and harvester can further comprise a plurality of wheels mounted at a respective bottom end of said plurality of vertically oriented elongated posts to facilitate a rolling movement of the vertical tuber planter and harvester along an underlying support surface.

In one embodiment, in the present vertical tuber planter and harvester, a first growing space can be formed between the lower surface of the intermediate platform and the upper surface of the bottom platform. Similarly, a second growing space can be formed between said lower surface of said top platform and said upper surface of said intermediate platform.

In other embodiments, the present vertical tuber planter and harvest can have further platforms, thereby creating further growing spaces. For example, the present vertical tuber planter and harvest can have four, five, or platforms, creating three, four, or five growing spaces.

In another embodiment, said bottom platform and said intermediate platform of the present vertical tuber planter and harvester have a first and a second stopper, respectively. Accordingly, when a lifting machine is used to lift the first paneled wheeled planter tray at an angle to the bottom platform, wheels of the first paneled wheeled planter tray are limited in movement by said first stopper. Similarly, when said lifting machine is used to lift the second paneled wheeled planter tray at an angle to the intermediate platform, wheels of the second paneled wheeled planter tray are limited in movement by said second stopper.

In a further embodiment of the present system, because of said lifting machine being used to lift the first paneled wheeled planter tray at an angle to the bottom platform, said lifted first paneled wheeled planter tray can be tilted to one side, and a panel on said one side can be opened, causing the first collection of soil and the first portion of the tuber crop to slide down out of the lifted first paneled wheeled planted tray. In this regard, the first collection of soil and the first portion of the tuber crop can slide down out of the lifted first paneled wheeled planted tray to fall onto the mesh covered container to separate the first collection of soil from the first portion of the tuber crop, wherein the first collection of soil can pass through the mesh to be collected in the container and the first portion of the tuber crop is stopped at the mesh where it can be harvested. The first collection of soil collected in the container can be reused in the system.

Similarly, the second collection of soil and the second portion of the tuber crop can slide down out of the lifted second paneled wheeled planted tray to fall onto the mesh covered container to separate the second collection of soil from the second portion of the tuber crop, wherein the second collection of soil can pass through the mesh to be collected in the container and the second portion of the tuber crop is stopped at the mesh where it can be harvested. The second collection of soil collected in the container can be reused in the system.

In one embodiment, a position of the intermediate platform can be vertically adjusted, thereby adjusting a size of the first growing space and the second growing space.

In another embodiment, the shaker can be used to shake the mesh covered container to assist the first collection of soil in passing through the mesh. Similarly, the shaker can be used to shake the mesh covered container to assist the second collection of soil in passing through the mesh.

Figure 2:
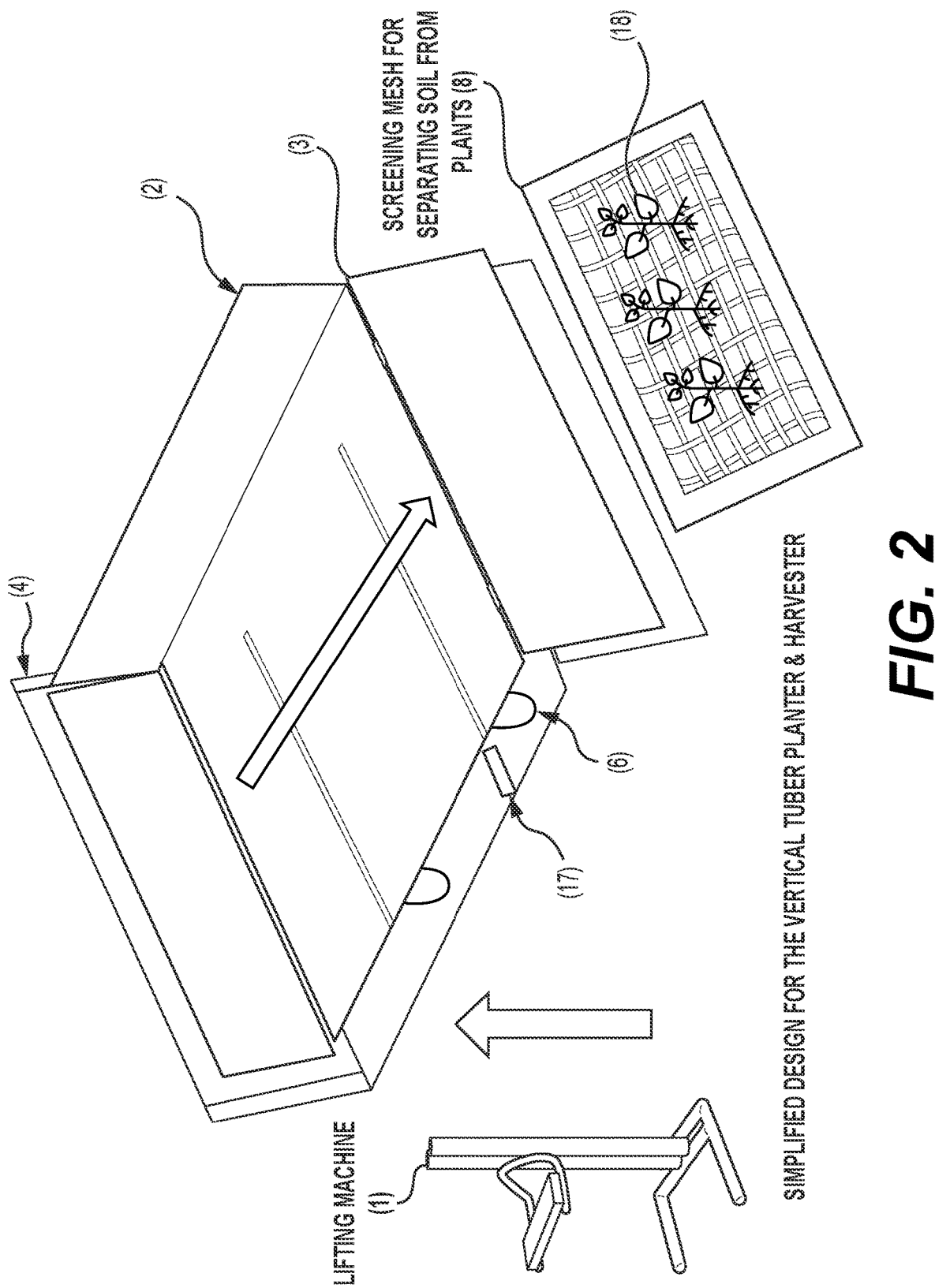
FIG. 2 is a ¾ view of one of the wheeled planter trays of the VTPH device.
Figure 3:
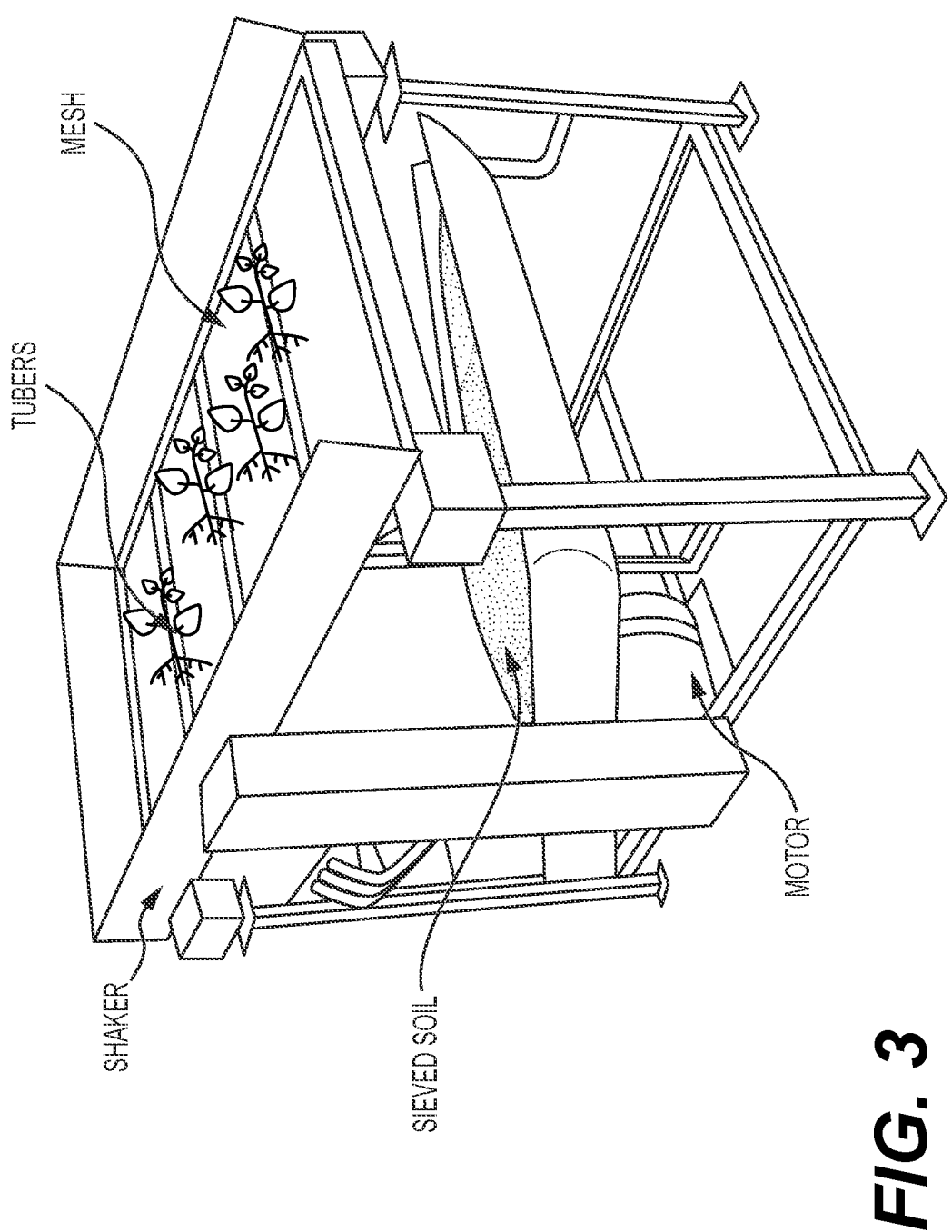
FIG. 3 is a ¾ view of VTPH device with a shaker attached to VTPH device.

FIG. 1 depicts a side view of the VTPH device which includes a support assembly consisting of a tiered and wheeled framework and platform arrangement (4) with two growing spaces (5), a bottom one and a top one, each growing space (5) housing an allotment of soil (10) for growing a crop of root tubers (18) where each crop is a collection of individual tubers (11) optimally spaced throughout the growing spaces (5). Within each growing space (5) of the VTPH device is a wheeled planter tray (2) with folding panels. FIG. 2 provides a depiction of a paneled wheeled planter tray (2) with wheels (6) with one of the panels folded downwards (3).

As shown in FIG. 1, the support assembly of the VTPH has a tiered and wheeled framework and platform arrangement (4) and comprises a bottom platform having a rolling mechanism such as wheels (9) on the underside thereof to facilitate a rolling movement of the VTPH along an underlying support surface such as a building floor (not shown); a plurality of vertically oriented elongated posts arranged parallel and spaced apart from one another and extending upwards from corners an upper surface of the bottom platform; an intermediate platform positioned above said bottom platform and spaced apart therefrom, said intermediate platform attached to said plurality of vertically oriented elongated posts arranged parallel and spaced apart from one another at corners of said intermediate platform; a top platform positioned above said intermediate platform and spaced apart therefrom, wherein said plurality of vertically oriented elongated posts arranged parallel and spaced apart from one another and extending upwards from corners an upper surface of said intermediate platform attach to a lower surface of said top platform at corners of said lower surface of top platform; a first paneled wheeled (6) planter tray (2) resting on said upper surface of said bottom platform; and a second paneled wheeled (6) planter tray (2) resting on said upper surface of said intermediate platform; a plurality of water sprinkler heads (12) mounted on said lower surface of said top platform and said lower surface of said intermediate platform; a plurality of growing lights (13) mounted on said lower surface of said top platform and said lower surface of said intermediate platform; and a plurality of wheels (9) mounted at a respective bottom end of said plurality of vertically oriented elongated posts to facilitate a rolling movement of the VTPH along an underlying support surface.

A first and second growing space (5) are created between the lower surface of the intermediate platform and the upper surface of the bottom platform and between the lower surface of the top platform and the upper surface intermediate platform, respectively. Each growing space can be, by way of non-limiting example, 110 cm in height as shown in FIG. 1. However, by moving the intermediate platform up or down, the size of the respective growing spaces can be changed. Each growing space (5) allows for the placement of a paneled wheeled planter tray (2) in a closed configuration such that a tuber crop (18) can be grown for harvesting when the crop is appropriately matured in growth.

Each paneled wheeled planter tray (2), when inserted into its respective growing space (5) in a closed configuration, provides a receptacle for a portion of the tuber crop (18) and soil (10). Each paneled wheeled planter tray (2) also can have drainage holes at the bottom surface of each paneled wheeled planter tray (2) that allows for the drainage of excess water from the irrigation provided from sprinklers (12). The VTPH also can have a water pump (14) that attaches to a water source (not shown) to pump water to the sprinkler system for the implementation of a desired irrigation cycle. The VTPH also can have a valve (16) for irrigation control (not shown) to control the flow of water from the pump to the supply lines for the sprinkler (12). And finally, the VTPH also can have an electrical socket (15) such that electricity from a source (not shown) can be provided to the growth lights (13) and the water pump (14) to provide illumination and irrigation as needed. The growth lights can be LED lights, but other known lighting alternatives and configurations can be used.

As shown in FIGS. 1 and 2, each paneled wheeled planter tray (2), when in a closed configuration and inserted into a growth space (5) of the VTPH, can provide an optimal environment for an indoor vertical planting application. The growth volume of each paneled wheeled planter tray (2) can be, by way of non-limiting example, 1 m×1 m×50 cm, where the 1 m dimension is either a width or length dimension and the 50 cm is a height measurement. However, the width and/or length can of the paneled wheeled planter tray (2) can also be a 1 m×2 m configuration, or any other configuration desired.

When the tuber crop (18) is ready to be harvested, a lifting machine (1) can be used to lift a paneled wheeled planter tray (2) upwards at a slight angle to the particular platform upon which it resides, either the bottom platform or the intermediate platform. Due to this lifting action, the paneled wheeled planter tray (2) will roll by means of the wheels (6) towards the stopper (17) on either platform whereupon a panel (3) on the tilted side of the tray can be opened to drop down, as shown in FIG. 2, and the soil (10) and tuber crop (18) can slide down the tilted paneled wheeled planter tray (2) into sifting container (7) which has a mesh screen (8) for separating the individual tubers (11) of the tuber crop (18) from the soil (10). A standard agitation action such as shaking the mesh (8) and container (7) arrangement allows the individual tubers (11) to be extracted from the soil (10).

Accordingly, the entire tuber crop (18) can be efficiently collected, separated, and harvested, without the reliance upon hand tools, as the system allows intact tubers to be collected by lifting and pushing the soil in a paneled wheeled planter tray (2) to a mesh (8) or other screener by applying a mechanical or automated pressure for the lifting action. Therefore, loss and damage are drastically minimized. Additionally, the soil (10) can be reused after being collected from the mesh separation process. Further benefits include the reduction of physical labor used during the harvesting process. It is estimated that 100% of tubers can be harvested if appropriate tools are used. The VTPH is a practical and adjustable system that allows for customizable scalability for growing requirements as it pertains to tubers of different sizes and cultivation parameters with extremely minimal loss and/or damage. It can be used in homes, rooftops, buildings, small farms, or even large farms due to the modularity of the VTPH device.

It is to be understood that the indoor vertical planting method, system, and device for planting tubers is not limited to the specific embodiments described above but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A system for planting and harvesting tubers, the system comprising:
    a vertical tuber planter and harvester comprising a tiered and wheeled framework having various platforms located thereon comprising:
        a bottom platform having a rolling mechanism to facilitate a rolling movement of the vertical tuber planter and harvester along an underlying support surface;
        a plurality of vertically oriented elongated posts arranged parallel and spaced apart from one another and extending upwards from corners of an upper surface of the bottom platform;
        an intermediate platform positioned above said bottom platform and spaced apart from said bottom platform, said intermediate platform attached to said plurality of vertically oriented elongated posts arranged parallel and spaced apart from one another at corners of said intermediate platform, said plurality of vertically oriented elongated posts extending upwards from an upper surface of said corners of said intermediate platform;
        a top platform positioned above said intermediate platform and spaced apart from said intermediate platform, wherein said plurality of vertically oriented elongated posts arranged parallel and spaced apart from one another and extending upwards from the upper surface of the corners of said intermediate platform attach to a lower surface of said top platform at corners of said lower surface of said top platform;
        a first paneled wheeled planter tray having a first plurality of wheels that rest on said upper surface of said bottom platform, wherein said first paneled wheeled planter tray, when in a closed configuration, is a receptable containing a first collection of soil and a first portion of a tuber crop;
        a second paneled wheeled planter tray having a second plurality of wheels that rest on said upper surface of said intermediate platform wherein said second paneled wheeled planter tray, when in a closed configuration, is a receptable containing a second collection of soil and a second portion of said tuber crop;
        a plurality of water sprinkler heads mounted on said lower surface of said top platform and a lower surface of said intermediate platform; and
        a plurality of growing lights mounted on said lower surface of said top platform and said lower surface of said intermediate platform; and
    a separate mesh covered container, positioned adjacent to the first paneled wheeled planter and the second paneled wheeled planter, which when shaken is used to separate one or more of the first collection of soil from the first portion of the tuber crop, or the second collection of soil from the second portion of the tuber crop,
    wherein the vertical tuber planter and harvester further comprises a third plurality of wheels mounted at a respective bottom end of said plurality of vertically oriented elongated posts to facilitate the rolling movement of the vertical tuber planter and harvester along the underlying support surface.

2. The system of claim 1, wherein the vertical tuber planter and harvester further comprises a water pump for pumping water to the plurality of water sprinkler heads.

3. The system of claim 2, wherein a second growing space is formed between said lower surface of said top platform and said upper surface of said intermediate platform.

4. The system of claim 1, wherein the vertical tuber planter and harvester further comprises an electrical socket for connecting to an electrical power source to provide electricity to the water pump and the growing lights.

5. The system of claim 1, wherein a first growing space is formed between said lower surface of said intermediate platform and said upper surface of said bottom platform.

6. The system of claim 1, wherein said bottom platform and said intermediate platform have a first and a second stopper, respectively.

* * * * *